July 3, 1934.  D. W. SHERMAN  1,965,561
AUTOMOBILE FRAME
Filed Sept. 18, 1933   2 Sheets-Sheet 1
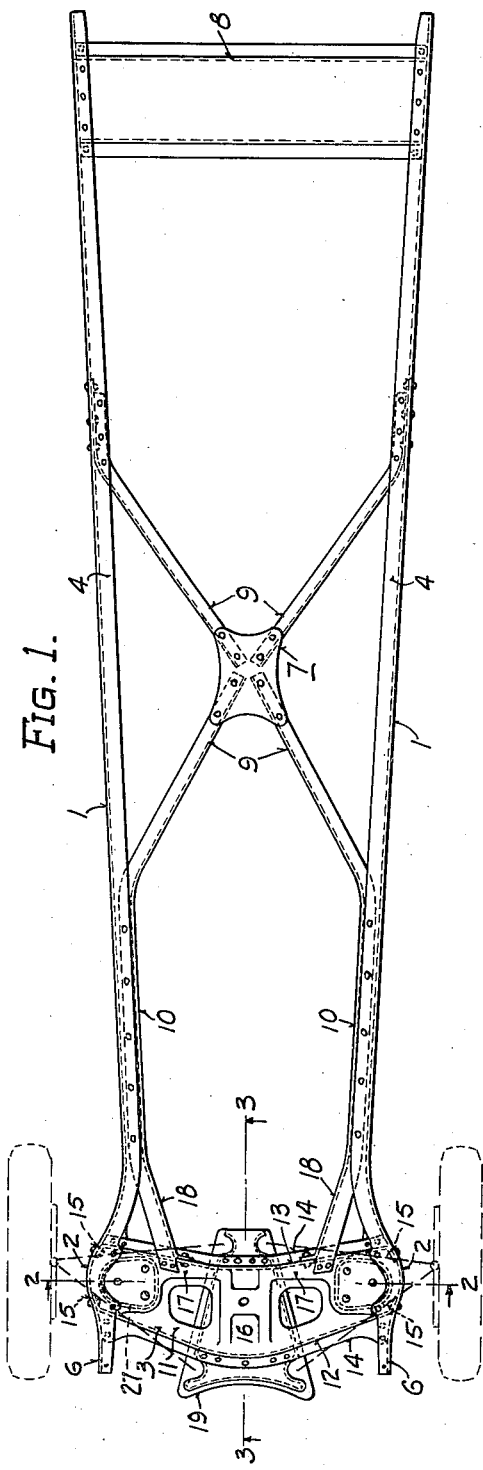
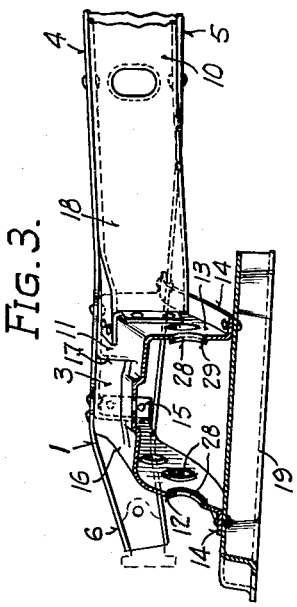
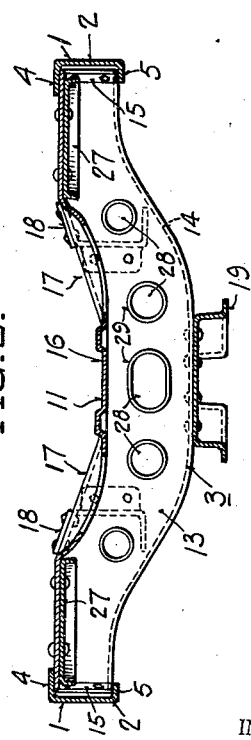
INVENTOR.
Donald W. Sherman
BY
ATTORNEY.

July 3, 1934.     D. W. SHERMAN     1,965,561
AUTOMOBILE FRAME
Filed Sept. 18, 1933     2 Sheets-Sheet 2

INVENTOR.
Donald W. Sherman
BY
ATTORNEY.

Patented July 3, 1934

1,965,561

UNITED STATES PATENT OFFICE 1,965,561

AUTOMOBILE FRAME

Donald W. Sherman, Milwaukee, Wis., assignor to A. O. Smith Corporation, Milwaukee, Wis., a corporation of New York Application September 18, 1933, Serial No. 689,854

9 Claims. (Cl. 280—106)

This invention relates to an automobile frame and more particularly to a frame adapted for use in automobiles having independently sprung front wheel mountings. Such constructions eliminate the necessity of employing a front axle extending across the car between the wheels and provide many advantages which ultimately result in easier riding and steering of the car.

The object of the present invention is to provide a strong lightweight frame which is particularly adapted for independently sprung front wheel mounting and which is more economical to fabricate.

Other objects will appear hereinafter.

The accompanying drawings illustrate one embodiment of the invention, and

Figure 1 is a top plan view of the frame;

Fig. 2 is an enlarged transverse section on line 2—2 of Fig. 1 showing the construction of the front cross bar;

Fig. 3 is a detail section taken on line 3—3 of Fig. 1 showing the cross bar;

Figure 4:
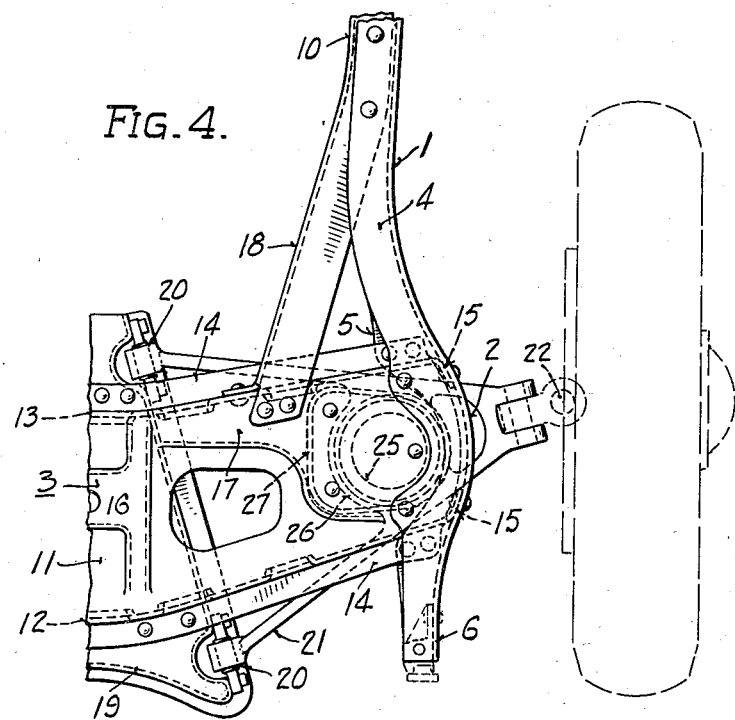
Fig. 4 is an enlarged plan view of one side of the front end of the frame showing the use of the frame with one type of wheel mounting for which it is adapted.

The frame consists principally of channel-shaped members forming side rails, cross bars, and sub-rails.

The side bars 1 are of the usual channel construction with the exception that a portion 2 of each bar, at the end of the front cross bar 3, is curved outwardly at approximately the center line of the front wheels and around the end of the cross bar as shown in Fig. 1. The outwardly curved portions of the side bars are substantially in the transverse vertical plane of the forward wheels so as not to interfere materially with the turning of the wheels in steering. The term "transverse vertical plane of the forward wheels" may be generally defined to include the space between a transverse line drawn from the forward side of one wheel to the forward side of the other wheel and a similar transverse line drawn from the rear side of one wheel to the rear side of the other wheel.

The upper and lower flanges 4 and 5, respectively, of the side bars face inwardly to receive corresponding flanges on sub-rails as hereinafter described. The forward ends 6 of the side bars are extended to provide means for attaching a bumper, and are preferably closer together than the outwardly curved portions 2 to provide greater space for turning of the front wheels in steering.

The frame may comprise as many cross bars and sub-rails as are desirable. The frame illustrated has an inverted U-shaped cross bar 3 at the forward end, an X-shaped cross bar 7 at the center, and a rear cross bar 8 at the rear end. The latter two bars 7 and 8 are of any suitable construction, the bar 7 being fabricated from a plurality of channel members 9 extending in the form of an X and having its ends secured to the side rails 1.

The outer ends of the forward channel members 9 extend along the side bars 1 forming sub-rails 10. The sub-rails 10 have their flanges facing outwardly and engaging the flanges 4 and 5 of the side bars to which they are riveted or welded.

The front cross bar 3 is constructed of an integral sheet of metal and is of inverted U or channel section having an upper horizontal web 11, downwardly extending side webs 12 and 13, and outwardly projecting horizontal flanges 14 at the lower edges of the side webs.

The outer ends of the web 11 are curved corresponding to the outward curvature 2 of the side bars 1 and are riveted or welded to the upper flanges 4 of the side bars.

The outer ends of the side webs 12 and 13 have inwardly projecting flanges 15 riveted to the vertical webs of the side bars 1.

The ends of the flanges 14 are riveted or welded to the lower flanges 5 of the side bars 1.

The central portion 16 of the cross bar 3 is depressed downwardly to pass under the forward end of the engine and radiator (not shown).

The bar 3 is ribbed transversely at 17, a predetermined distance from each end, to strengthen the bar at that point and determine the extent of the downward depression 16 of the bar.

The bar is additionally strengthened adjacent the ribs 17 by braces 18 which are formed from the ends of the forward sub-rails 10. These braces 18 extend diagonally inward and forward from the side bars 1 and are secured by riveting or welding to the upper web 11 and side web 13 of the front cross bar 3.

Figure 5:
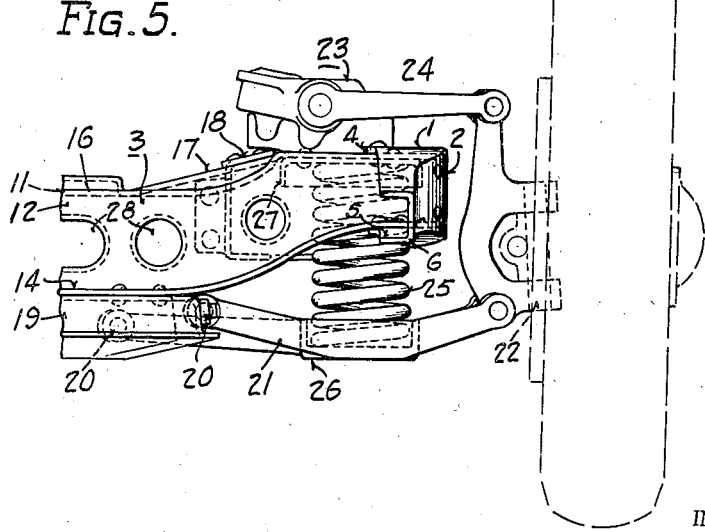
Fig. 5 is a front view of the part shown in Fig. 4.

In use, as illustrated in Figures 4 and 5, the cross bar 3 has attached beneath it, near the center, a pan 19 having two pairs of bearing members 20. A wishbone member 21 is pivoted to each pair of bearings and extends laterally to a point adjacent to the vertical spindle 22 of the forward wheels of the car. The outer ends of the wishbones 21 are pivotally connected to the lower end of the spindles 22 to allow the wheels to move vertically.

A shock absorber 23 is mounted on each side bar 1 and the arms 24 of the shock absorbers extend laterally and are pivotally connected to the upper ends of the spindles.

A compression coil spring 25 is mounted at each end of the cross bar 3 beneath the upper web 11 between the ribs 17 and the side bars 1 and upon trays 26 supported on the wishbones 21. These springs are positioned as close to the ends of the cross bar 3 as the outward curvature 2 of the side bars 1 will allow. It is preferable to cut away portions of the lower flanges 5 of the side bars to accommodate the springs 25 as shown.

A cap 27 is riveted to the web 11 to provide an upper seat for the coil spring at each end of the bar.

The invention provides a cross bar construction of great strength to withstand the stresses set up by the particular type of front wheel mounting. The bar may be lightened in weight, if desired, by openings 28 cut in the side webs 12 and 13 as shown. The openings 28 are surrounded by short inwardly projecting flanges 29 to strengthen the bar.

The frame is of simple construction, requiring only a single piece of metal for the front cross bar and requiring no additional parts such as a bumper mounting base, or strengthening member.

Various different embodiments of the invention may be employed within the scope of the accompanying claims.

I claim:

1. An automobile frame adapted for independently sprung front wheel mounting, comprising two opposed channel-shaped side rails each having a portion curved outwardly beyond the normal line of the side rail near the forward end thereof and in substantially the transverse vertical plane of the forward wheels, and a front cross bar extending between said side rails and secured at its ends to said outwardly curved portions of the side rails.

2. An automobile frame adapted for independently sprung front wheel mounting, comprising two opposed channel-shaped side rails each having a portion curved outwardly beyond the normal line of the side rail near the forward end thereof and in substantially the transverse vertical plane of the forward wheels, and a front cross bar extending between said side rails and secured at its ends to said outwardly curved portions of the side rails, said cross bar being of inverted U-shaped cross section having lateral flanges at the lower edges of its side webs secured at their ends to the lower flanges of the side rails, the upper horizontal web of the cross bar being secured to the upper flanges of the side rails.

3. An automobile frame adapted for independently sprung front wheel mounting, comprising two opposed channel-shaped side rails each having a portion curved outwardly beyond the normal line of the side rail near the forward end thereof, and a front cross bar extending between said side rails and secured at its ends to said outwardly curved portions of the side rails, said cross bar being of inverted U-shaped cross section having lateral flanges at the lower edges of its side webs secured at their ends to the lower flanges of the side rails, the upper horizontal web of the cross bar being secured to the upper flanges of the side rails, and the cross bar being ribbed to provide spring seats at its ends and a downwardly depressed central portion.

4. An automobile frame adapted for independently sprung front wheel mounting, comprising two opposed channel-shaped side rails each having a portion near its forward end curved outwardly beyond the normal line of the side rail and in substantially the transverse vertical plane of the forward wheels, a front cross bar extending between said side rails and secured at its ends to said outwardly curved portions of the side rails, and a brace extending diagonally inward and forward from each side rail and having its forward end secured to said cross bar.

5. An automobile frame adapted for independently sprung front wheel mounting, comprising two opposed channel-shaped side rails each having a portion near its forward end curved outwardly beyond the normal line of the side rail, a front cross bar extending between said side rails and secured at its ends to said outwardly curved portions of the side rails, said cross bar being of inverted U-shape having lateral flanges at the lower edges of its side webs secured at their ends to the lower flanges of the side rails, the upper horizontal web of the cross bar being secured to the upper flanges of the side rails, and the cross bar being ribbed to provide spring seats at its ends and a downwardly depressed central portion, and a brace extending diagonally inward and forward from each side rail and having its forward end secured to said cross bar adjacent a rib therein.

6. An automobile frame adapted for independently sprung front wheel mounting, comprising two opposed channel-shaped side rails each having a portion near its forward end curved outwardly beyond the normal line of the side rail and in substantially the transverse vertical plane of the forward wheels, sub-rails of channel shape having their flanges attached to the flanges of the side rails and extending rearwardly of said outwardly curved portion of the side rails, and a front cross bar extending between said side rails and secured at its ends to said outwardly curved portions of the side rails, the forward ends of said sub-rails being secured to said cross bar intermediate its ends to brace the same.

7. An automobile frame adapted for independently sprung front wheel mounting, comprising two opposed channel-shaped side rails each having a portion curved laterally beyond the normal line of the side rail near the forward end thereof, and in substantially the transverse vertical plane of the forward wheels, and a front cross bar extending between said side rails and secured at its ends to said laterally curved portions of the side rails.

8. An automobile frame adapted for independently sprung front wheel mounting, comprising two opposed channel-shaped side rails and a sheet metal cross bar extending between said side rails and attached at its ends thereto in substantially the transverse vertical plane of the forward wheels, said cross bar being of inverted U-shaped cross section having lateral flanges at the lower edges of its side webs secured at their ends to the lower flanges of the side rails, the upper horizontal web of the cross bar being secured to the upper flanges of the side rails, and having a seat for a coil spring at each end thereof and between the side rails and bearings near the center of the cross bar for pivotally securing wishbone members connected at their outer ends to the forward wheels and supporting the coil springs beneath said seats.

9. An automobile frame adapted for independently sprung front wheel mounting, comprising two opposed channel-shaped side rails each having a portion curved laterally beyond the normal line of the side rail near the forward end thereof, and in substantially the transverse vertical plane of the forward wheels, and a front cross bar extending between said side rails and secured at its ends to said laterally curved portions of the side rails, said cross bar having a seat adjacent each end thereof for receiving coil springs.

DONALD W. SHERMAN.